United States Patent [19]

Heuner et al.

[11] 3,758,792

[45] Sept. 11, 1973

[54] PEAK DETECTOR CIRCUIT

[75] Inventors: Robert Charles Heuner, Bound Brook; Goetz Wolfgang Steudal, Flemington, both of N.J.

[73] Assignee: RCA Corporation, New York, N.Y.

[22] Filed: Sept. 5, 1972

[21] Appl. No.: 286,083

Related U.S. Application Data

[63] Continuation of Ser. No. 128,702, March 29, 1971, abandoned.

[52] U.S. Cl. .............. 307/235 A, 307/241, 307/246, 307/251, 328/151

[51] Int. Cl. ...... H03k 5/18, H03k 5/53, H03k 17/60

[58] Field of Search .................... 307/235 A, 235 R, 307/246, 251, 241; 324/103 P; 328/115, 151

[56] References Cited

UNITED STATES PATENTS

| | | | |
|---|---|---|---|
| 3,430,072 | 2/1969 | Stevens | 328/151 X |
| 3,489,921 | 1/1970 | Mietz et al. | 307/235 |
| 3,564,287 | 2/1971 | Todd | 307/235 |
| 3,596,109 | 7/1971 | Marshall | 307/235 A |
| 3,609,407 | 9/1971 | Garuts | 307/235 A X |
| 3,654,561 | 4/1972 | Egawa et al. | 328/151 |

*Primary Examiner*—John W. Huckert
*Assistant Examiner*—L. N. Anagnos
*Attorney*—H. Christoffersen

[57] ABSTRACT

A circuit which changes state to produce a different output signal level at the peak of a substantially periodically varying analog input signal whereby the peak of the input signal is detected and indicated.

9 Claims, 3 Drawing Figures

INVENTORS
Robert C. Heuner &
Goetz W. Steudel
BY J. Donald Weber, Jr.
ATTORNEY

PEAK DETECTOR CIRCUIT

This is a continuation of application, Ser. No. 128,702, filed Mar. 29, 1971, now abandoned.

BACKGROUND OF THE INVENTION

There are many demodulators and peak detector circuits known in the prior art. Many of these demodulators and peak detectors require transformers for coupling a reference carrier signal or the like to a demodulating circuit. This circuit configuration is relatively costly and difficult to fabricate.

In addition, there are many peak detector circuits known in the art which utilize semiconductor elements and devices. Many of these peak detector circuits are relatively complex and costly. In addition, these circuits are frequently difficult to fabricate especially with integrated circuit techniques.

SUMMARY OF THE INVENTION

In one embodiment of the invention, there is provided a peak detector circuit which includes a plurality of semiconductor devices such as metallic-oxide-semiconductor (MOS) transistors. The semiconductor devices are interconnected so as to make the operation of the circuit independent of the value of the individual threshold voltages thereof. In addition, a coupling network couples the input signal to the semiconductor devices. The coupled signal selectively causes the switching of the semiconductor devices at a predetermined level of the input signal wherein the peak of the input signal is detected.

DESCRIPTION OF THE PREFERRED EMBODIMENTS

Figure 1:
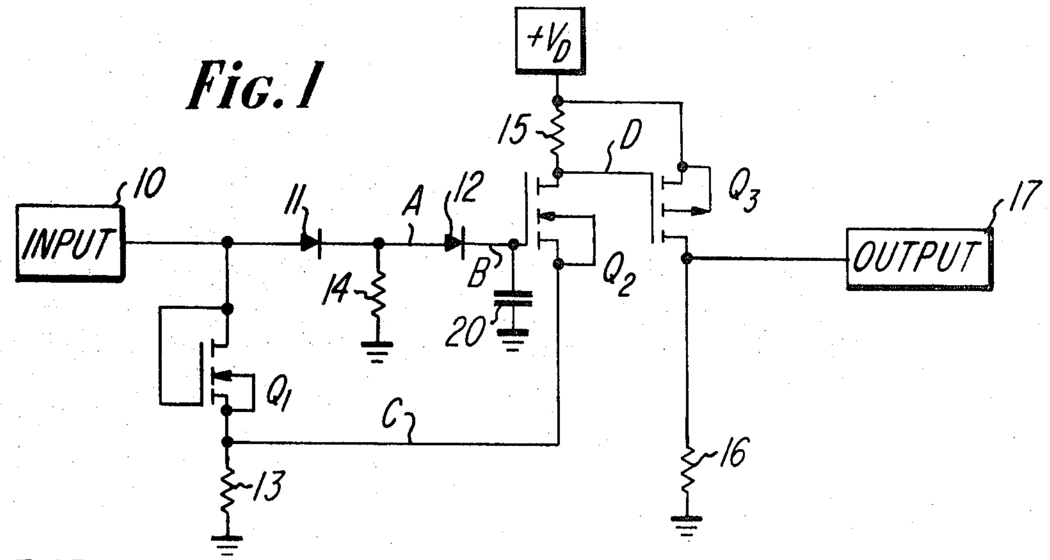
FIG. 1 is a schematic diagram of one embodiment of the instant invention.

In the following description, like components bear like reference numerals.

Referring now to FIG. 1, there is shown a schematic diagram of a preferred embodiment of the instant invention. A suitable input source 10 is provided. Input source 10 provides an input signal which has a periodic function, for example, a sine wave. The peak-to-peak amplitude of the input signal, as well as the d.c. level thereof, should be relatively stable or only very slowly changing in order to provide optimum circuit operation. The D.C. level of the input signal should preferably be at least one N-threshold above the reference potential (which is ground potential in this embodiment). In addition, there are provided at least three active MOS transistors which are designated as transistors Q1, Q2, and Q3. Transistors Q1 and Q2 are of the N-channel MOS transistor type which are diffused in a P-well in a suitable substrate. Transistor Q3 is a P-channel MOS transistor which is diffused in the same substrate. In addition, diodes 11 and 12 along with the resistors 13, 14, 15 and 16 may be appropriate semiconductor devices formed on the aforementioned substrate. While integrated circuit fabrication techniques may be utilized, the circuit is not limited to this type of fabrication.

In particular, input source 10 is connected to the anode of diode 11 and to the common connection of the gate and drain electrodes of transistor Q1. The source electrode of transistor Q1 is connected to ground or other suitable reference source via resistor 13. In addition, the source electrode of transistor Q1 is connected to the source electrode of transistor Q2. The drain electrode of transistor Q2 is connected to a suitable voltage source $+V_D$ via resistor 15. The voltage $+V_D$ is defined to be equal to or greater than the peak voltage of the input signal plus the P-threshold voltage minus the N-threshold voltage.

The cathode of diode 11 is connected to the anode of diode 12. The common junction of diodes 11 and 12 is connected to ground or other suitable reference potential via resistor 14. The cathode of diode 12 is connected to the gate electrode of transistor Q2. Capacitor 20 is connected between the gate electrode of transistor Q2 and a suitable reference potential, for example, ground. Typically, capacitor 20 may represent the gate electrode capacitance of transistor Q2. The drain electrode of transistor Q2 is connected to the gate electrode of transistor Q3. The source electrode of transistor Q3 is connected to source $+V_D$ while the drain electrode of transistor Q3 is connected to ground via resistor 16. Output utilization means 17 is connected to the drain electrode of transistor Q3.

Figures 2, 3:
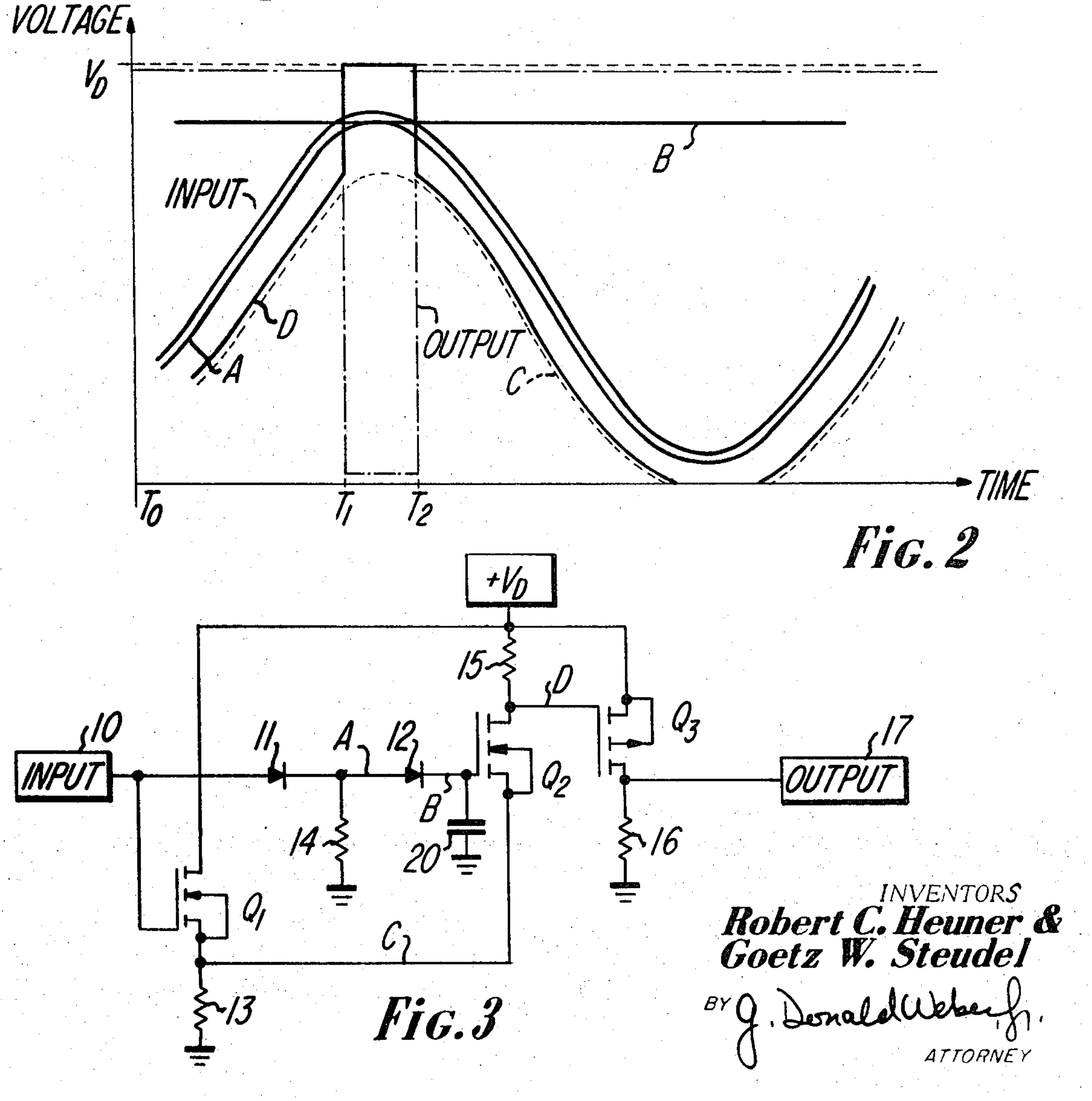
FIG. 2 is a diagram of the waveforms associated with the circuit embodiment shown in FIG. 1.
FIG. 3 is a schematic diagram of another embodiment of the instant invention.

In discussing the operation of the circuit, concurrent reference is made to FIG. 2. As noted supra, input source 10 provides an input signal which is a periodic function such as a sine wave. The input signal is so designated in FIG. 2. The input sine wave (or the like) is applied to the anode of diode 11 and to the drain electrode of transistor Q1. Inasmuch as resistor 14 has a very large resistance magnitude, the current through diode 11 and resistor 14 is of very small magnitude and produces a very small voltage drop (approximately 0.2 volt) across diode 11. Consequently, the signal at point A (i.e., the anode of diode 12) substantially identically follows the input signal waveshape but has an instantaneous magnitude approximately 0.2 volt lower than the input signal level.

As noted supra, while capacitor 20 may in some applications be a discrete capacitor, the gate capacitance of the N-unit transistor Q2 is frequently sufficiently large to cause the circuit to operate properly. The application of signal A via diode 12 causes capacitor 20 to be charged to a voltage which is substantially equal to the peak of the wave of signal A at the anode of diode 12. Thus, the signal detected at point B will be substantially identical with the maximum or peak voltage produced by the input signal at point A in the circuit. Consequently, diode 12 will, in steady state conditions, exhibit negligible voltage drop thereacross in the forward direction. In addition, diode 12, which may be a graded junction diode, has a very low reverse leakage. Likewise, the gate electrode of transistor Q2 has almost no leakage in view of the extremely high impedance thereof. Thus, with no significant leakage, a substantially constant voltage B is applied at the gate electrode of transistor Q2. The substantially constant voltage at B is equal to the peak voltage produced at point A.

Concurrently, the input signal is supplied to the drain and gate electrodes of transistor Q1. Thus, transistor Q1 operates substantially as a source follower. The resistance value of resistor 13 is chosen to be high, with respect to the impedance of transistor Q1 when conductive, whereby a small magnitude current exists in transistor Q1. Since there is a relatively small current, the voltage from the gate electrode to the source electrode of transistor Q1 is almost independent of the input voltage and is very close to the threshold voltage of transistor Q1. Consequently, the voltage at point C substantially identically follows the input signal but has an instantaneous magnitude which is less than the input signal by the threshold voltage across transistor Q1. the signal at point C is applied to the source electrode of transistor Q2.

Since transistor Q2 is an N-type transistor, transistor Q2 is rendered conductive so long as the voltage applied to the source electrode thereof is negative by an amount equal to the N- threshold (or more) with respect to the voltage supplied to the gate electrode thereof. During the time period TO–T1 (FIG. 2), the input signal is an increasing potential signal. Likewise, the voltage signals at points A and C are also increasing signals. (The signal level at circuit point B is depicted as having already achieved the steady state voltage level equivalent to the peak of the signal detected at point A.) Of course, the voltage at point B would not obtain the voltage level equivalent to the peak voltage of the signal at point A until one or more input signal cycles had occurred.

In view of the relationship between the signals at points C and B, transistor Q2 is conductive from time TO to time T1. Since transistor Q2 is conductive, the signal at point D (i.e., the gate electrode of transistor Q3) is substantially identical in form and voltage level with the signal at point C. This condition exists inasmuch as resistor 15 is chosen to be very much greater in resistance magnitude than the impedance of transistor Q2 when it is in the conducting condition and little or no voltage drop across transistor Q2 occurs. Signals C and D are substantially contiguous. However, signal C is shown in dashed line, displaced from signal D for clarity.

The signal at point D is relatively negative with respect to the voltage $+V_D$, which is applied to the source electrode of transistor Q3 and transistor Q3 is rendered conductive. Again, the impedance of resistor 16 is chosen to be very much greater than the resistance of transistor Q3 when it is in the conducting condition. Consequently, little or no voltage is dropped across transistor Q3 wherein the output signal detected at output device 17 is substantially identical to the $+V_D$ voltage level during time period TO–T1. The output signal is represented by a dash-dot line to better distinguish from the other waveforms.

At time period T1, the signal at circuit point C reaches a voltage level which is equal to the voltage at point B minus the threshold voltage for transistor Q2. At this point, transistor Q2 ceases to be biased for conduction and is rendered nonconductive. Although the circuit path through transistor Q2 is interrupted, the voltage at point C continues to follow the input signal, as shown by the dashed line. However, when transistor Q2 is nonconducting, the voltage level at point D is not controlled by the C signal and, therefore, rises rapidly toward the voltage $+V_D$. Since the voltage applied to the gate and the source electrodes of transistor Q3 then are substantially identical, insufficient difference therebetween exists to overcome the threshold voltage of transistor Q3. Consequently, transistor Q3 is rendered nonconductive. As a result of transistor Q3 being nonconductive, the output signal switches rapidly toward the relatively negative voltage applied at the lower terminal of resistor 16, in this case approximately ground potential. Clearly, at the critical condition, i.e., when the difference between the voltages at points B and C is less than the threshold voltage of transistor Q2 (time period T1, the output signal rapidly switches from the very positive level $+V_D$ to the relatively negative level, for example, ground potential.

However, at time period T2 the input signal has passed the peak thereof and has started on a down slope portion of the curve. Obviously, the voltage levels at points A and C follow the input signal. At time period T2 the voltage at circuit point C has fallen to a point wherein the difference between the voltages at points B and C is equivalent to the threshold voltage of transistor Q2. When the threshold voltage difference is attained, transistor Q2 is rendered conductive and the voltage level at circuit point D rapidly drops close to the voltage level at circuit point C. The voltage level at point C is sufficiently different from the source voltage $+V_D$ such that transistor Q3 is rendered conductive. When transistor Q3 is conductive, the source voltage $+V_D$ is again supplied to output device 17 wherein the output signal rapidly switches from ground potential level to the $+V_D$ level. This type of operation and signal production at output device 17 will recur for each peak of the input signal.

Thus, there is described a circuit which detects the peaks of a sinusoidal or similar waveform. The width of the output signal (i.e., time period T1–T2) which is generated to bracket the peak of the input signal is a function of the ratio of the peak-to-peak amplitude of the sine wave input signal to the voltage drop across diode 11 in the region of the peak voltage of the input signal. By properly adjusting the voltage drop across diode 11 (which is also a function of the resistance of resistor 14), the peak detector circuit can operate quite accurately in terms of switching at the peak of the input signal. Moreover, by properly matching transistors Q1 and Q2 and by establishing a very small current through Q1 from the input, there is provided essentially a voltage independent threshold drop across Q1. In addition, the threshold drop for transistors Q1 and Q2 are also closely matched. Consequently, the interconnection shown of transistors Q1 and Q2 provides a threshold independent switch connected to the source of transistor Q2. In then, the threshold voltage drops of transistors Q1 and Q2 are effectively cancelled.

Referring now to FIG. 3, there is shown another embodiment of the instant invention. In this embodiment, the drain electrode of transistor Q1 is connected to the $+V_D$ source instead of being connected to the input. The gate electrode of transistor Q1 is still connected to input 10 to receive the input signal. The remainder of the circuit remains as shown in FIG. 1.

The operating principles of the circuit shown in FIG. 3 are substantially identical with those of the circuit of FIG. 1. The circuit in FIG. 3 clearly does not impose as great a load on the input circuit as does the circuit of FIG. 1. That is, source $+V_D$ supplies the current to transistor Q1. On the other hand, the circuit of FIG. 3 does not have as high a degree of accuracy in peak detection as the FIG. 1 circuit. That is, even though the resistance of resistor 13 is very high relative to the resistance of transistor Q1 (when conductive), the current through transistor Q1 and resistor 13 is subject to a wider range of variation than in the former circuit. Consequently, the operation of the circuit may vary slightly thereby causing a small relative inaccuracy in the peak detection function. It should be noted, however, that the small inaccuracy is not of significance or consequence in most applications of the circuit.

The separate embodiments operate substantially interchangeably. The FIG. 1 circuit configuration is utilized where extreme accuracy in peak detection is required. The FIG. 3 circuit configuration is utilized wherever it is necessary to prevent loading of the input source.

There is, thus, described a peak detector circuit which detects the peak voltage points of a periodic input signal. The circuit described supra operates to detect a positive peak of the signal. By reversing source polarities and the conductivity types and/or directions of the semiconductors, a negative peak detector circuit can be provided. Both the positive and negative peak detectors may be connected together wherein the positive and negative peak signals of a periodic input signal may be detected.

In addition, the circuit has been described in terms of transistors, diodes and resistors. It is to be understood that these components may be combined in a monolithic integrated circuit structure, a hybridized circuit configuration or in a bipolar and discrete component configuration. The description is not meant to be limitative of the invention, but merely illustrative thereof. The scope of the invention is defined by the appended claims.

What is claimed is:

1. A circuit to detect the voltage peak of an input signal, comprising:

first and second semiconductor devices each having first and second terminals defining the ends of a conduction path, and a control electrode for controlling the conduction of said conduction path, said conduction path of said first semiconductor device being rendered conductive when the voltage established between its said control electrode and said first terminal exceeds a first threshold voltage, said conduction path of said second semiconductor device being rendered conductive when the voltage established between its said control electrode and first terminal exceeds a second threshold voltage;

means for applying a first fixed potential resistively coupled to said second terminal of said second semiconductor device;

means receptive to said input signal for detecting and storing a voltage indicative of the maximum voltage attained by said input signal;

means for directly applying said stored voltage to said control electrode of said second semiconductor device;

negligible impedance means directly applying said input signal to said control electrode of said first semiconductor device;

means for applying a second fixed potential resistively coupled to a circuit junction connecting said first terminals of said first and second semiconductor devices, said first semiconductor device continuously applying a modified input signal equal to the input signal voltage minus the first threshold voltage to said first terminal of said second semiconductor device, said second semiconductor device conducting said modified input signal so long as said input signal has not attained the value of said stored voltage plus the difference between the first and second threshold voltages; and utilization means coupled to the second terminal of said second semiconductor device for developing an output voltage having a first level when the second semiconductor device is conductive, and a second level, indicative of the occurrance of a peak of the signal, when the second semiconductor device is rendered non-conductive.

2. The circuit recited in claim 1 wherein said detecting and storage means comprises:

means for unidirectionally coupling said input signal to the control electrode of said second semiconductor device and capacitor means connected between said control electrode of said second semiconductor device and a point of fixed potential for charging to and holding a voltage indicative of the maximum voltage attained by the signal.

3. The circuit recited in claim 2 wherein said unidirectional coupling means includes a unidirectional conduction device biased to a low forward current conducting condition and establishing a reference voltage between the signal and the control electrode of the second semiconductor device and permitting substantially no reverse leakage current therethrough.

4. The circuit recited in claim 1 wherein said utilization means includes a third semiconductor device having first and second terminals defining the ends of a conduction path and a control electrode for controlling the conduction of the conduction path, said first and second semiconductor devices being of a first conductivity type and said third semiconductor device being of a second different conductivity type, said control electrode connected to said second terminal of said second semiconductor device;

negligent impedance means coupling said first terminal of said third semiconductor device to said first fixed potential voltage; and means resistively coupling the second terminal of said third semiconductor device to said second fixed potential, said second terminal being an output terminal at which said output voltage is developed.

5. The circuit recited in claim 1 wherein the second terminal of said first semiconductor device is connected to said control electrode of said second semiconductor device.

6. The circuit recited in claim 1 including means for coupling said second terminal of said first semiconductor device to a point of fixed potential.

7. The peak detector recited in claim 1 wherein said first and second semiconductor devices are fabricated in a single integrated circuit monolithic structure and the threshold characteristics of said first and second semiconductor devices are substantially identical.

8. A circuit to detect the voltage peak of an input signal, comprising:

first and second MOS transistors of the same conductivity type, each of said MOS transistors having gate, source and drain electrodes, said first and second MOS transistors being rendered conductive when first and second threshold voltages are established between said gate and source electrodes of said first and second transistors, respectively, said first and second MOS transistors being constructed to have essentially the same operating characteristics;

a third MOS transistor of opposite conductivity type to that of said first and second MOS transistors, and having gate, source and drain electrodes, said gate being connected to said drain of said second MOS transistor, means for applying a first fixed potential resistively coupled to said drain electrode of said second MOS transistor and connected to said source electrode of said third MOS transistor;

means for unidirectionally coupling said input signal to said gate electrode of said second MOS transistor;

capacitor means connected to said gate electrode of said second MOS transistor for charging to and holding a voltage indicative of the maximum voltage attained by said input signal;

means for applying a second fixed potential resistively coupled to a circuit junction connecting said source electrodes of said first and second MOS transistors;

means for directly applying said input signal to said gate and drain electrodes of said first MOS transistor, said first MOS transistor continuously applying a modified input signal equal to said input signal voltage minus said first threshold voltage to said source electrode of said second MOS transistor, said second MOS transistor conducting said modified input signal so long as said input signal voltage is less than the value of said held voltage, said first threshold voltage cancelling said second threshold voltage when said input signal voltage attains the value of said held voltage; and means resistively coupling said drain electrode of said third MOS transistor to said second fixed potential, said first fixed potential established at said drain electrode of said third MOS transistor as long as its said gate receives said modified input signal from said second MOS transistor, said second fixed potential established at said drain electrode of said third MOS transistor, indicating the occurrance of a voltage peak of the signal, when said second MOS transistor is rendered non-conductive.

9. A circuit to detect the voltage peak of a signal, comprising:

first and second MOS transistors of the same conductivity type, each of said MOS transistors having gate, source and drain electrodes, said first and second MOS transistors being rendered conductive when first and second threshold voltages are established between said gate and source electrodes of said first and second MOS transistors, respectively, said first and second MOS transistors being constructed to have essentially the same operating characteristics;

a third MOS transistor of opposite conductivity type to that of said first and second MOS transistors, and having gate, source and drain electrodes, said gate being connected to said drain of said second MOS transistor;

means for applying a first fixed potential resistively coupled to said drain electrode of said second MOS transistor and connected to said drain electrode of said first MOS transistor and said source electrode of said third MOS transistor;

means for unidirectionally coupling said input signal to said gate of said second MOS transistor;

capacitor means connected to the gate electrode of said second MOS transistor for charging to and holding a voltage indicative of the maximum voltage atttained by said input signal;

means for applying a second fixed potential resistively coupled to a circuit junction connecting said source electrodes of said first and second MOS transistors;

means for directly applying said input signal to said gate electrode of said first MOS transistor, said first MOS transistor continuously applying a modified input signal equal to said input signal voltage minus said first threshold voltage to said source electrode of said second MOS transistor, said second MOS transistor conducting said modified input signal so long as said input signal voltage is less than the value of said held voltage, said first threshold voltage cancelling said second threshold voltage when said input signal voltage attains the value of said held voltage; and means resistively coupling said drain electrode of said third MOS transistor to said second fixed potential, said first fixed potential established at said drain electrode of said third MOS transistor so long as its gate receives said modified input signal from said second MOS transistor, said second fixed potential established at said drain electrode of said third MOS transistor, indicating the occurrence of a voltage peak of the signal, when said second MOS transistor is rendered non-conductive.

* * * * *